Aug. 9, 1955
G. R. DIXON
2,714,915
DETONATOR SHUNT APPLICATORS
Filed Aug. 14, 1950
6 Sheets-Sheet 2
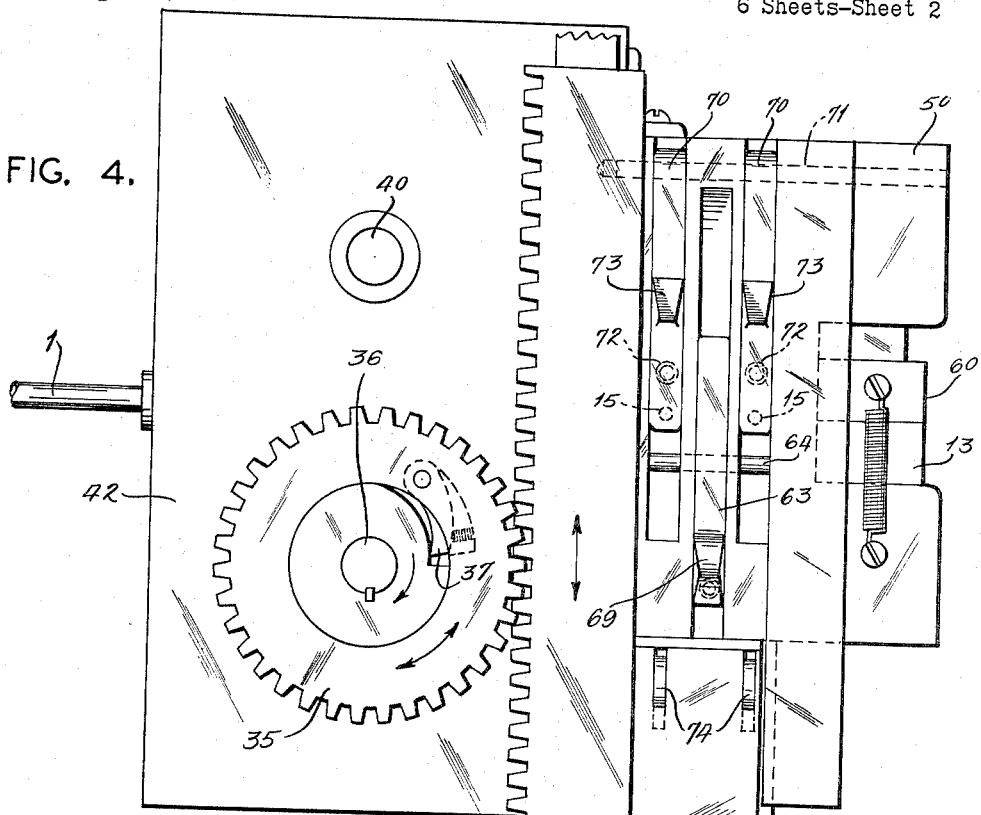
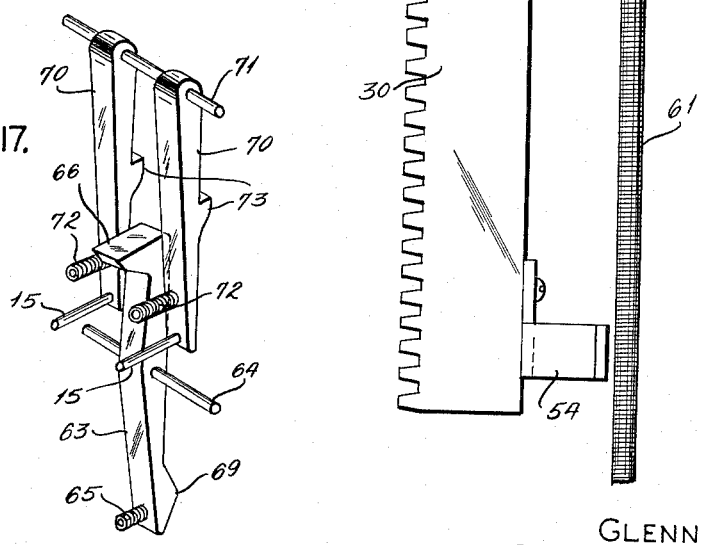
INVENTOR:
GLENN R. DIXON
BY Bruninga and Sutherland
ATTORNEYS.

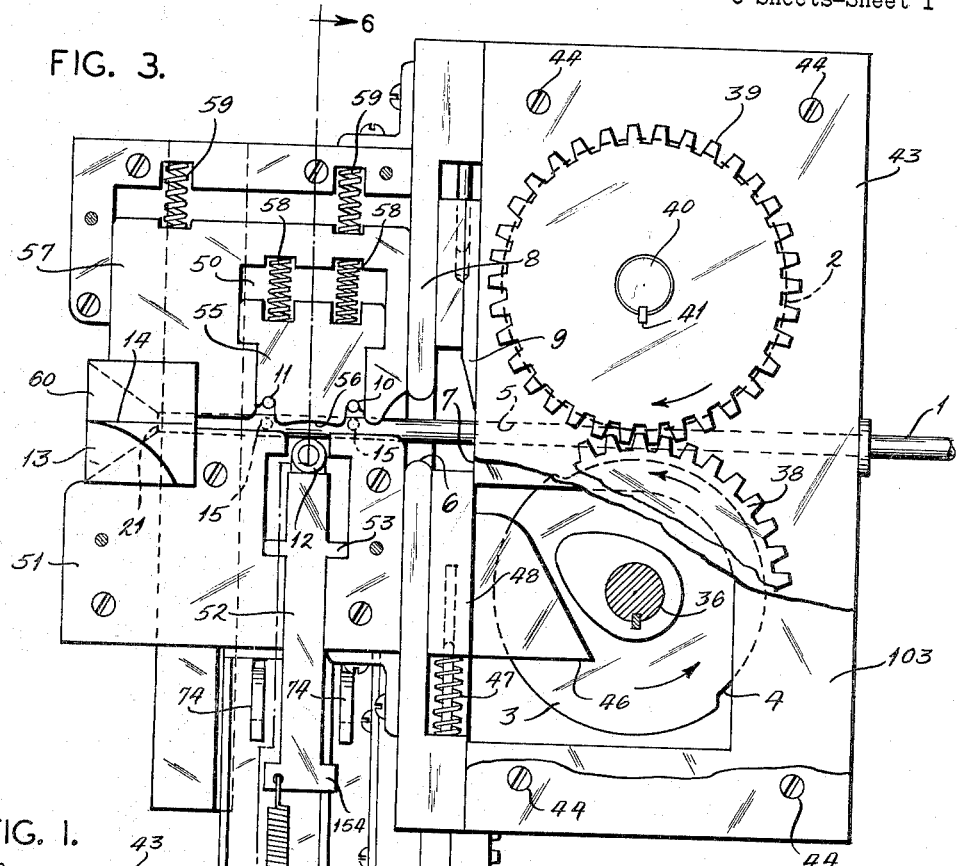

Aug. 9, 1955  G. R. DIXON  2,714,915
DETONATOR SHUNT APPLICATORS
Filed Aug. 14, 1950  6 Sheets-Sheet 3
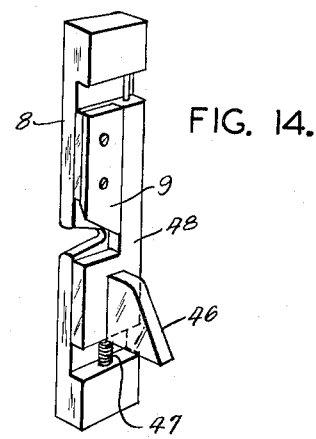
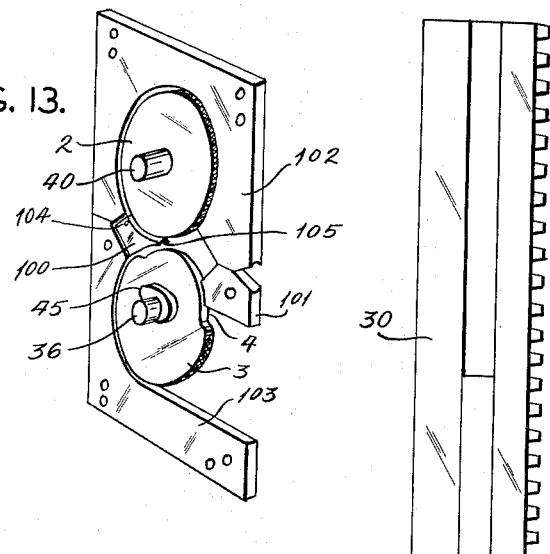
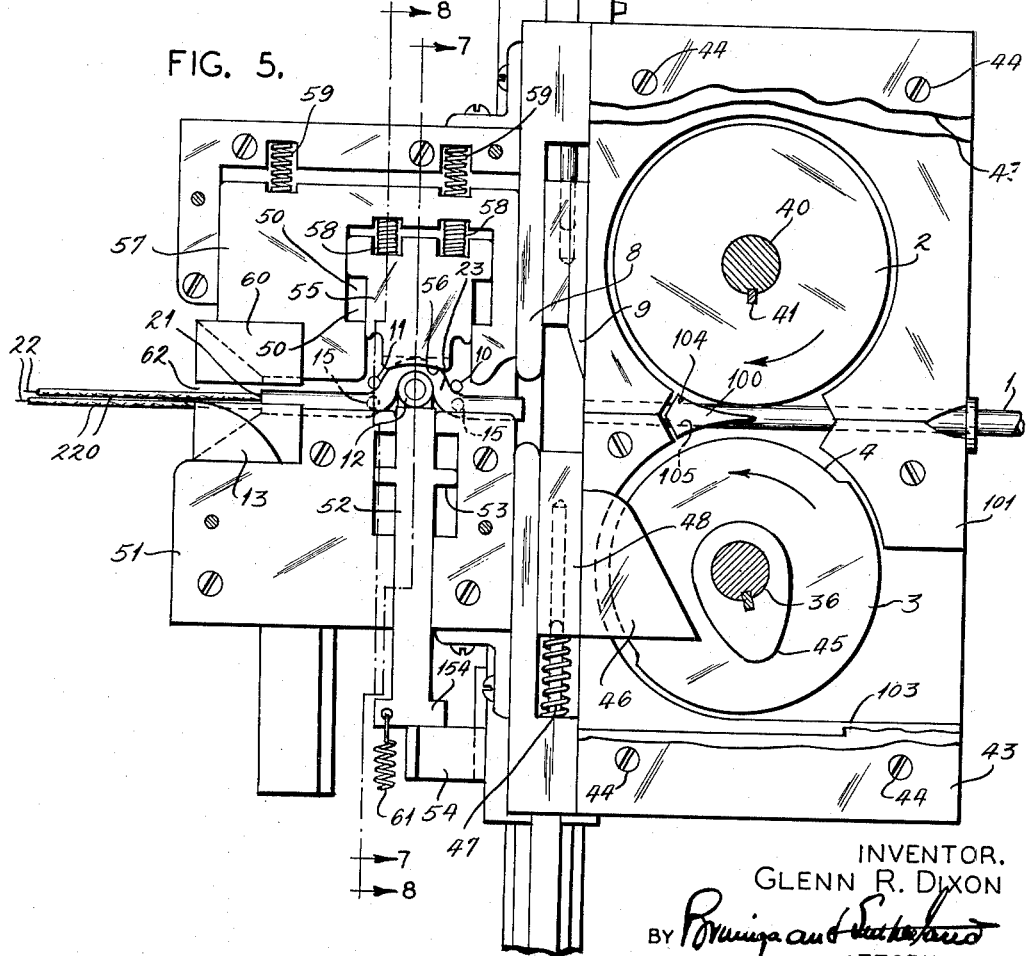
INVENTOR.
GLENN R. DIXON
BY
ATTORNEYS.

Aug. 9, 1955

G. R. DIXON 2,714,915

DETONATOR SHUNT APPLICATORS

Filed Aug. 14, 1950

INVENTOR:
GLENN R. DIXON
BY *Bruinga and Sutherland*
ATTORNEYS.

Aug. 9, 1955    G. R. DIXON    2,714,915
DETONATOR SHUNT APPLICATORS
Filed Aug. 14, 1950    6 Sheets-Sheet 5
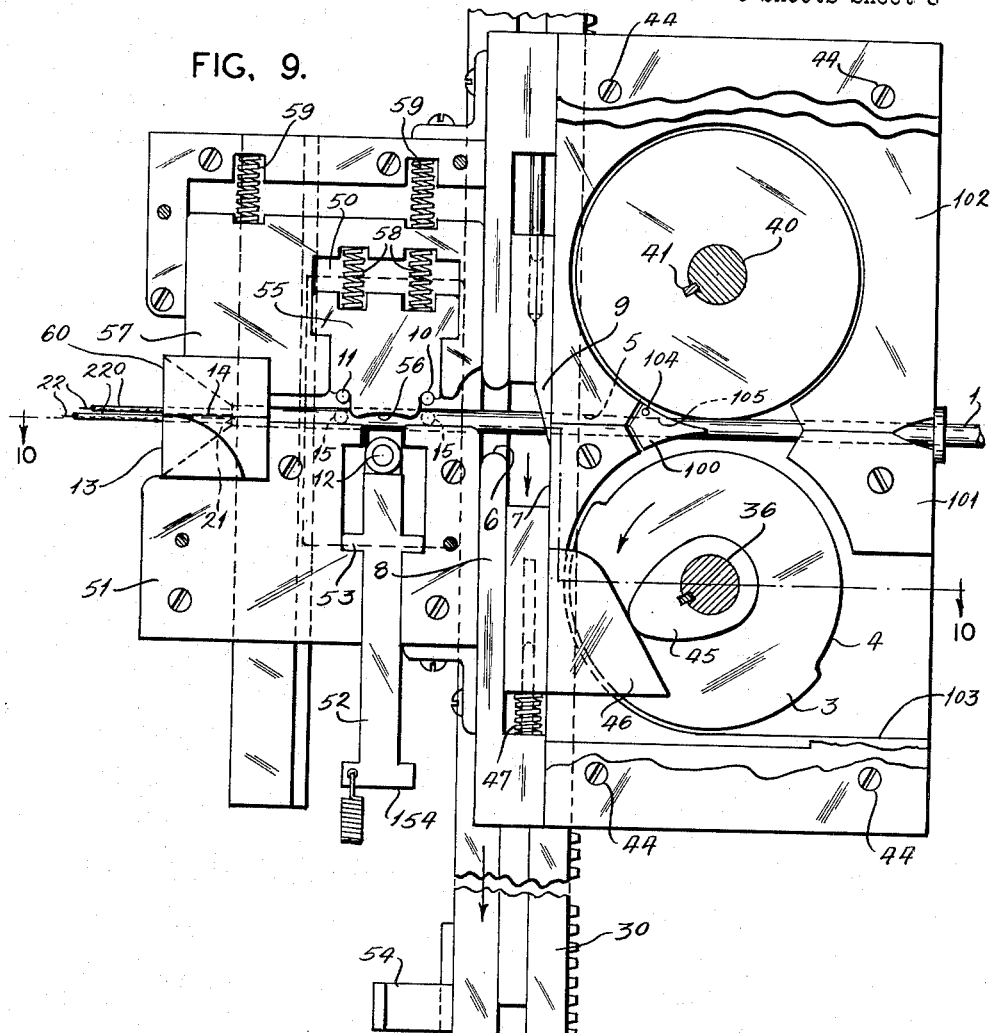
FIG. 9.
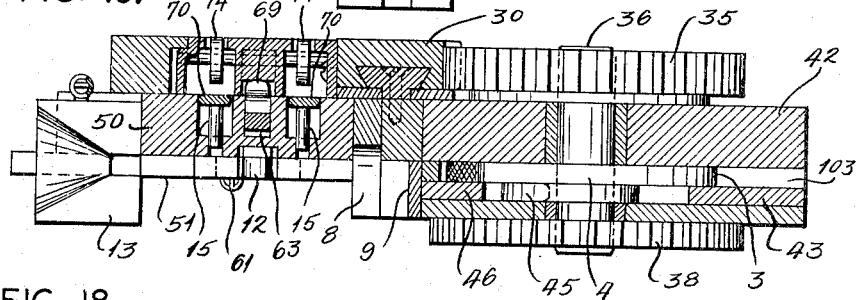
FIG. 10.
FIG. 18.
INVENTOR:
GLENN R. DIXON
BY Bruninga and Sutherland
ATTORNEYS.

Aug. 9, 1955
G. R. DIXON
2,714,915
DETONATOR SHUNT APPLICATORS
Filed Aug. 14, 1950
6 Sheets-Sheet 6
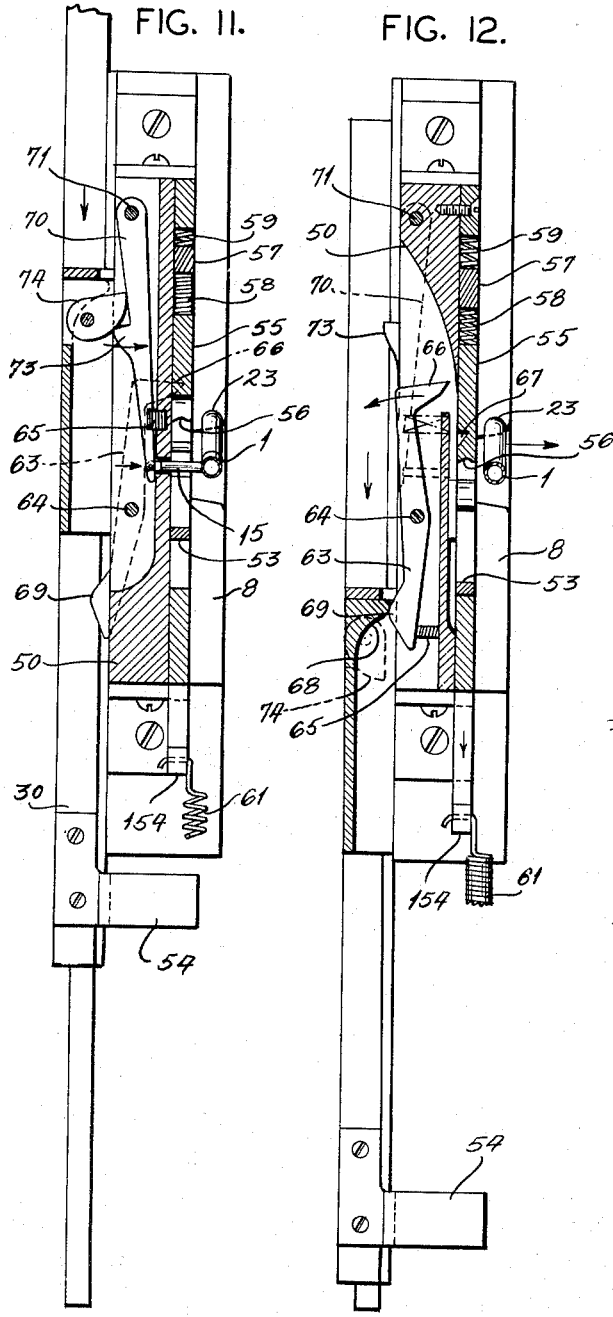
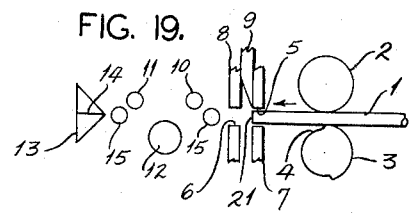
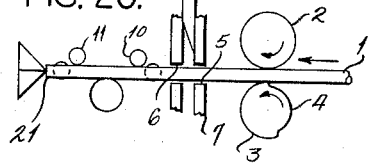
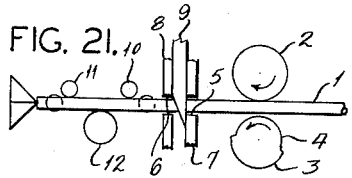
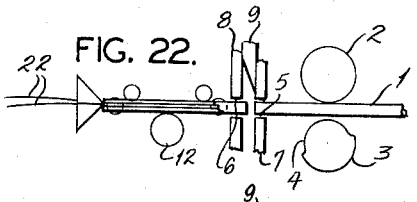
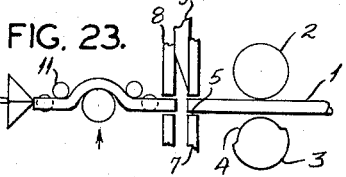
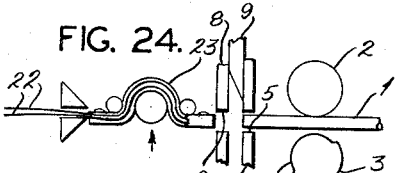
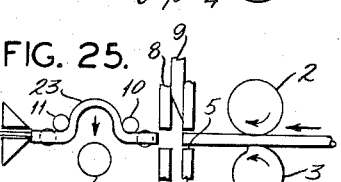
INVENTOR:
GLENN R. DIXON
BY
ATTORNEYS.

United States Patent Office 2,714,915
Patented Aug. 9, 1955

2,714,915

DETONATOR SHUNT APPLICATORS

Glenn R. Dixon, Alton, Ill., assignor to Olin Mathieson Chemical Corporation, a corporation of Virginia Application August 14, 1950, Serial No. 179,349

9 Claims. (Cl. 153—1)

This invention relates generally to devices for sheathing wires, and particularly to the application of an insulating sheath upon the bare ends of lead wires for electric detonators whereby to electrically connect the leads together, yet protect them during storage, transportation, and handling.

It is customary to provide the bare ends of the lead wires for electric detonators with some type of shunt whereby to prevent inadvertent firing of the detonators until they are properly connected in a firing circuit. Such shunting of the lead wires is satisfactorily provided by positioning the wires in contact with each other and within a tubular sheath. The application of such a tubular sheathed shunt to detonator lead wires has heretofore involved a multiplicity of separate manual operations. Insulating tubing was cut into short lengths, the short lengths then threaded by hand over the bare ends of the lead wires, and finally the tubing and contained wires were manually crimped to maintain them in proper relationship.

The object of the present invention, generally stated, is to provide an apparatus for applying tubular sheaths to shunt detonator lead wires and, more particularly, an apparatus adapted to receive the bare ends of lead wires and automatically operate upon them to produce a sheathed shunt securely anchored in position.

Other objects will become apparent to those skilled in the art when the following description is read in connection with the accompanying drawings, in which:

Figure 1 is a view in side elevation of a fluid-pressure-operated apparatus, constructed in accordance with the present invention, showing the lead wires inserted at one side of the device and the shunt tubing at the other side;

Figure 2 is an end view of a portion of Figure 1, showing the gate for insertion of the lead wires;

Figure 3 is an enlarged view in the same elevation as Figure 1, and showing the apparatus of Figure 1, with certain cover plates removed to reveal the relation of the moving parts;

Figure 4 is a view in side elevation of the device shown in Figure 3, but taken from the opposite side;

Figure 5 is a view in side elevation corresponding with Figure 3, but showing the moving parts at a different stage in their cycle of operation;

Figure 9 is a view in side elevation, corresponding to Figures 3 and 5, but showing the moving parts at a different stage in their cycle of operation;

Figure 10 is a sectional view taken along line 10—10 of Figure 9;

Figure 11 is a view of the same section shown in Figure 8, but showing the parts at a different stage in their cycle of operation;

Figure 12 is a view of the same section shown in Figure 6, but showing the parts at a different stage in their cycle of operation;

Figure 13 is a perspective view of the sheath-feeding parts of the device;

Figure 14 is a perspective view of the sheath-cutting parts of the device;

Figure 17 is a perspective view of a latch and ejector mechanism mounted in the reverse side of the plate shown in Figure 16;

Figure 18 is a perspective view of the shunted and crimped lead wires after being operated upon by the device of the present invention; and Figures 19 to 25, inclusive, are diagrammatic views showing the relation of the several active parts of the device at different stages during a cycle of operation.

Figure 6:
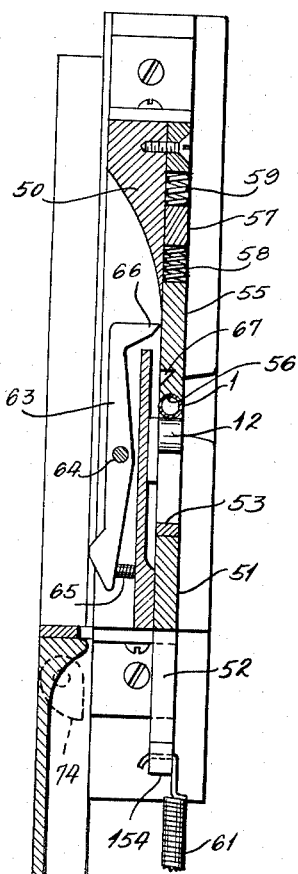
Figure 6 is a sectional view taken along line 6—6 of Figure 3.

In accordance with the present invention, a device is provided wherein cut lengths of insulation sheath are placed to receive the bare ends of lead wires, and then, with the lead wires within the sheath, the assembly is crimped and finally ejected. A particular feature of the present invention resides in the provision of mechanism whereby, in a given cycle of operation, the necessary series of operations occurs automatically. First the sheath is advanced into position whereat an open end thereof is disposed to receive the lead wires, the sheath cut to proper length, the lead wires are guided axially into the sheath, the assembly is crimped, and the assembly ejected. Where the lead wires are inserted manually, the cycle of automatic operations preferably begins with the crimping step and ends with the step of advancing and cutting the increment of sheath which will be used in the next succeeding cycle. The precise order in which the several steps, other than advancing, crimping, and ejecting, occur may be altered as desired.

For a detailed disclosure of an apparatus capable of carrying out the operations above-described, reference may be had to the accompanying drawings, in which an embodiment of the invention is shown. In order to facilitate such disclosure, reference may be had first to Figures 19 to 25, inclusive, which depict diagrammatically the relative positions of the several parts which act directly upon the sheath and lead wires as the cycle of operations progresses.

Suitable insulating sheath 1, delivered from a roll or straight length, is received between a feed roller 2 and a feed roller 3. The surface of feed roller 3 is interrupted, as shown at 4, so as to provide a portion of the circumference which is free of engagement with the sheath 1 during part of a revolution, and accordingly the circumferential length of that portion of roller 3 which is at the greater radius determines the length of sheath which is advanced in the direction of the arrow shown in Figure 19, in each cycle of operation, as the roller 3 moves counterclockwise from the position shown in Figure 19 to the position shown in Figure 20, where the open end 21 of the sheath is aligned with a gate 13.

From the rollers 2 and 3, the sheath passes through a pair of aligned apertures 5 and 6, located respectively in parallel guides 7 and 8. Between the guides 7 and 8, a cutting blade 9 is arranged to reciprocate vertically across the sheath and sever the same adjacent the face of guide 7. The cutting of the sheath occurs as the mechanism continues to move from the position shown in Figure 20 to the position shown in Figure 21.

After the sheath has been severed by blade 9, lead wires 22 are inserted through gate 13 and into the open end 21 of sheath 1, as shown in Figure 22.

Beyond the aperture 6, a pair of pins 10 and 11 is located above the upper surface of the sheath as it advances through aperture 6. The pins 10 and 11 are fixed, but pin 10 is preferably provided with a roller. Below the path of the sheath, and located midway between the pins 10 and 11, is a crimper 12, which is movable in a vertical direction from the position shown in Figure 19 to an extent sufficient to accomplish the desired crimp 23, as shown in Figure 24. The crimping action occurs as the mechanism moves from the position shown in Figure 22, through the position shown in Figure 23, to the position shown in Figure 24, during which time the rollers 2 and 3 are stationary.

Leftwardly beyond pin 11 is a gate 13, which is split and separable at parting 14. As the parts continue movement in the same direction as indicated in Figure 23, the crimper 12 and the upper half of gate 13 are concomitantly elevated to the position shown in Figure 24.

Located in alignment (as seen in Figure 19) with the path followed by the sheath 1, as it advances leftwardly from the position shown in Figure 19, is a pair of ejector pins 15. These ejector pins terminate behind the sheath 1 when the latter is in position for crimping, but when all other operations are complete, the pins 15 advance in a direction perpendicular to the elevation shown in Figure 19, i. e., toward the reader, so as to eject the assembly at right angles to the direction in which the sheath 1 has entered the space between the pins 10 and 11 and the crimper 12. At the time of the ejection, gate 13 is separated along parting line 14, as shown in Figures 24 and 25.

From the foregoing brief description of the parts which operate upon the sheath, the wire, or both, the movement of the parts to accomplish the required series of operations will be evident from Figures 19 to 25, inclusive. In the apparatus to be described in detail hereinafter, a cycle of automatic operations begins with the sheath 1 in the position shown in Figure 22, i. e., with the bare ends 22 of a pair of detonator lead wires inserted through gate 13 and into the free end 21 of a pre-cut section of sheath 1. With the parts in the position shown in Figure 22, the apparatus is set into motion and the series of operations hereinafter described automatically takes place. First, the crimper 12 moves upwardly from the position shown in Figure 22 to the position shown in Figure 23, thus making a U-bend 23 in the assembled sheath and wires. As the crimper 12 moves upwardly beyond the position shown in Figures 23, the gate 13 opens, as shown in Figure 24, to leave a space at line 14, such space being of sufficient width to permit the free passage of the lead wires outwardly therethrough. During the movements just described from the beginning of the cycle, the rollers 2 and 3 have been stationary. The crimper 12 now moves toward its initial position, and the ejector pins 15 are advanced in a direction perpendicular to the elevation shown in Figure 25, thus ejecting the crimped assembly of lead wire and sheath at right angles to the direction from which the sheath entered the space initially provided between the pins 10 and 11 and the crimper 12, i. e., toward the reader, as seen in Figure 25, and then closing the gate 13. During the ejecting movement, the feed roller 3 has turned with its lesser radius 4 adjacent the sheath 1, so that, as yet, there is no tendency to advance the supply portion of the sheath 1 further into the apparatus.

When the crimped assembly of sheath 1 and wires 22 has thus been ejected, the feed rollers continue in motion until that portion of roller 3, which is of greater radius, has engaged the supply portion of the sheath and advanced another increment thereof into position between pins 10 and 11 and crimper 12, as shown in Figure 20. Then follows the cutting operation, as shown in Figure 21, which completes the cycle. When a pair of wires has been inserted through gate 13 into the position shown in Figure 22, the cycle of operations is repeated.

In the embodiment shown in the drawings, the device is actuated through the cycle of operations above-described by a reciprocating rack 30, which is moved upwardly and downwardly by fluid pressure exerted within a cylinder 31 below and above piston 32, as shown in Figure 1. To initiate the operation of the device, the operator actuates a valve controlling the supply of fluid under pressure to pipe 33 of cylinder 31. To reverse the movement of rack 30, the pressure fluid is admitted through pipe 34. The reversal may take place automatically or be manually controlled. In the embodiment shown in the drawings, the operations shown diagrammatically in Figures 23, 24, and 25 occur on the upstroke of rack 30, while the operations shown in Figures 19 to 21 occur on the downstroke of the rack 30.

*Feeding*

The downward movement of rack 30 is transmitted to the feed wheels 2 and 3, through a gear 35, shown in Figure 4, which meshes with the rack and is mounted upon shaft 36, the opposite end of which (from the elevation shown in Figure 4) carries feed wheel 3. The gear 35 is provided with a pawl 37 arranged to transmit motion from the gear 35 to shaft 36 only in the clockwise direction, as shown in Figure 4. With the arrangement shown, wherein the gear 35 has but one pawl and but one abutment for engagement with the pawl, the amplitude of movement of rack 30 must be slightly in excess of the pitch circle of gear 35, so that said gear turns one complete revolution on the upstroke, and one complete revolution on the downstroke, of rack 30, but the feed wheels 2 and 3 are turned only on the downstroke of rack 30. Feed wheel 2 is driven from shaft 36, through a pair of gears located on the opposite side of the apparatus from gear 35, as shown in Figure 10. A gear 38 is secured upon shaft 36 for rotation therewith and meshes with a gear 39, secured for rotation with shaft 40, upon which latter the feed wheel 2 is secured for rotation by key 41, shown in Figure 5.

To mount the shafts 36 and 40, together with their adjunct parts, a base 42 is provided between gear 35 and the feed wheels 2 and 3. Between the feed wheels and the gears 38 and 39, a plate 43 is provided and securely affixed to the base 42 as by screws 44. Between base 42 and plate 43, a spacer is provided about the peripheries of feed wheels 2 and 3. The spacer may be integral, but is shown as consisting of four pieces 100, 101, 102, and 103, all connected to base 42, the latter three being securely connected, and part 100 being pivoted on pin 104. The part 100 is provided with a hole 105 to receive the sheath as the latter is peeled thereby from the feed wheels. The adjacent edges of parts 101—102 are concaved to provide a passageway to deliver the incoming sheath tangentially between the wheels 2 and 3; and the adjacent edges of parts 102—103 are similarly concaved to provide a passageway for the sheath as it emerges from hole 105 in part 100.

*Cutting*

Mounted upon shaft 36, for rotation therewith concomitantly with feed wheel 3, is a cam 45, shown in Figure 3. The cam is located between feed wheel 3 and plate 43, as shown in Figure 10, and is arranged for engagement, once in each revolution, with an inclined follower 46, shown in Figures 3 and 9. Upon engagement with the follower 46, the cutter 9 is moved downwardly against the action of a spring 47. As shown in Figure 14, the cutter 9 is mounted upon a bar 48, which reciprocates vertically within a recessed portion of guide 8. The follower 46 is integral with, or securely connected to, bar 48, so that downward forces applied to follower 46 move bar 48 and its cutter 9 downwardly against the action of spring 47. The position of cam 45 just prior to the beginning of the cutting stroke is shown in Figure 3, while the position of said parts at the end of the cutting stroke is shown in Figure 5. The cutting operation takes place upon the downward movement of rack 30, which is during the half-cycle of operation in which the shaft 36 is rotated.

*Crimping*

The crimping and ejecting mechanisms, together with the gate 13, are mounted in a housing 50 connected adjacent guide 8 and connected therethrough to base 42. The housing 50 includes a plate 51, recessed to accommodate a slide 52 having a cross-head 53. Elevated above the cross-head 53, the crimper 12 is mounted. In order to move the crimper 12 from its lowermost position (which it occupies when the sheath is fed), as shown in Figure 3, to the crimping position, rack 30 is provided with a lug 54, which engages an abutment 154 on the lower end of slide 52 when the rack approaches the upper limit of its travel. Continued upward movement of the rack 30, after the lug 54 engages abutment 154, is effective to elevate the crimper 12 relative to plate 51 and pins 10 and 11, thus crimping the sheath and encased lead wires, as shown in Figure 5.

Above the crimper 12, a plate 55 is resiliently mounted for vertical sliding movement, said plate being biased downwardly by a compound arrangement of springs hereinafter described. The plate 55 is provided with an arcuate portion 56 at the lower extremity thereof, arranged to snugly receive and act as an anvil for the sheath during the crimping operation.

Figure 15:
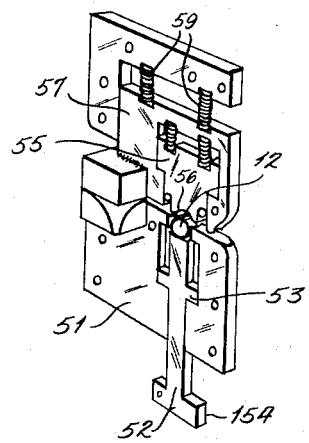
Figure 15 is a perspective view of the crimping parts of the device.
Figure 16:
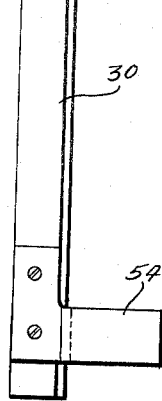
Figure 16 is a perspective view of a face plate for assembly with the reverse side of the parts shown in Figure 15.

The lower edge of plate 57 and the upper edge of plate 51 are oppositely grooved, as shown in Figure 15, to define a passageway which accommodates the sheath therebetween. These plates thus act as jaws to hold the sheath in alignment with the axis of gate 13, as long as they are in the position shown in Figure 3.

The plate 55 is slidably mounted in another plate 57, which in turn is guided for vertical sliding movement within the housing 50. The plate 55 is biased downwardly relative to plate 57 by a pair of springs 58, and the plate 57 is biased downwardly relative to the housing 50 by a pair of springs 59. During the upward movement of the rack 30, springs 58, as well as springs 59, are compressed, but the compression of the springs 59 is delayed, due to their greater strength, until after the springs 58 are substantially fully compressed.

The upper half 60 of gate 13 is affixed to plate 57 and moves with said plate upwardly under the impulse delivered from the rack 30 to the slide 52, through crimper 12, to plate 55, and through springs 58, to plate 57. The slide 52 is continuously biased in the downward direction by a spring 61, so that, as the rack 30 begins to move downwardly, the slide 52 is moved downwardly.

The upward movement of the slide 52, as above described, forces the crimper 12 against the sheath (and wires therewithin) disposed thereabove, from the position shown in Figure 3 to the position shown in Figure 5, thus forming crimp 23. During the initial increments of this movement, plate 55 is moved upwardly against its springs 58, and during the latter increments of this movement, i. e., after the springs 58 are fully compressed, further upward movement of the rack 30 and slide 52 moves plate 57 against the action of springs 59, thus opening the gate 13, as shown in Figure 5, and providing a space 62, through which the crimped assembly may be ejected sidewise (i. e., toward the reader).

*Ejecting*

When the rack 30 reaches the upper limit of its travel, the parts are in the position shown in Figure 5, or slightly more elevated than there shown. Reversal of the movement of the rack 30 releases the engagement between lug 54 and abutment 154, so that slide 52, carrying crimper 12, moves downwardly under the influence of spring 61. The plates 55 and 57 are, however, temporarily latched in their elevated positions shown in Figure 5 and remain so latched until the crimped assembly is ejected, all of which occurs during the downward movement of rack 30.

Figure 7:
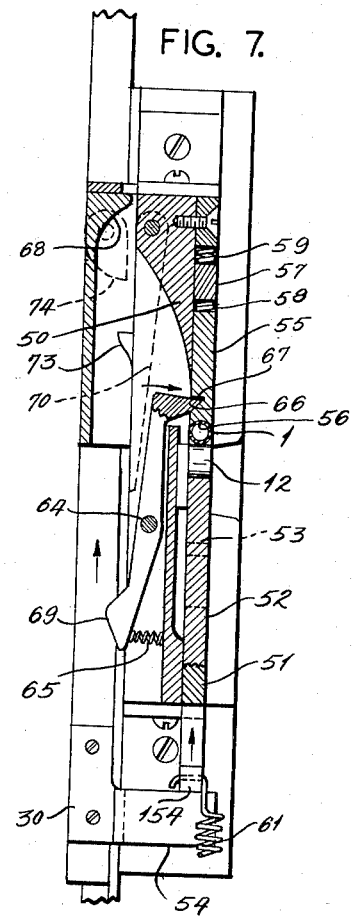
Figure 7 is a sectional view taken along line 7—7 of Figure 5.

The latching of the plates 55 and 57 in their elevated position is acomplished by mechanism shown most clearly in Figures 6 and 7. Affixed to the rear (i. e., the elevation opposite that shown in Figures 3 and 5) of housing 50 is a latch 63 pivoted upon a pin 64, and biased by a spring 65 in the clockwise direction, as seen in Figures 6 and 7. The latch 63 has a tang 66 arranged to engage an indentation 67 in the rear of plate 55 when the latter is elevated to the position shown in Figure 5, which is the position shown in Figure 7. When the tang 66 is seated in the indentation 67, the slide 52, which carries crimper 12, may be depressed without the plate 55 immediately following. The plate 55 remains in its upper latched position until the rack 30 has moved downwardly nearly to the position shown in Figure 12 where a cam surface 68 on the rack engages tail 69 of latch 63 and moves the latter in the counterclockwise direction about its pivot 64, thus releasing the tang 66 from the indentation 67 and permitting the plates 55 and 57 to move downwardly under the influence of springs 58 and 59.

Figure 8:
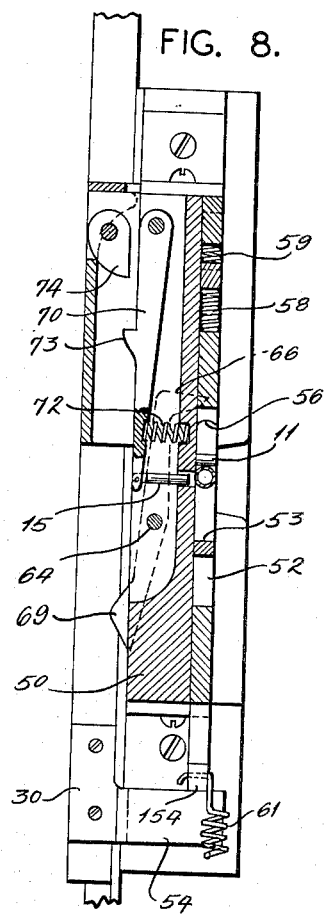
Figure 8 is a sectional view taken along line 8—8 of Figure 5.

As the rack 30 moves downwardly from the position shown in Figure 7, toward the position shown in Figure 12, the ejector mechanism is actuated. This operation is shown most clearly in Figures 8 and 11. Each ejector pin 15 is mounted upon the free end of a lever 70, pivoted to housing 50 through pin 71. There are two such levers 70, each carrying a pin 15, as shown in Figures 4 and 17. The levers 70 are biased in the clockwise direction, as shown in Figure 8, by spring 72, which maintains the ejector pins 15 normally clear of the passage occupied by the sheath being operated upon. Each of levers 70 is provided with an abutment 73 arranged to engage a sear 74 pivotally mounted on the rack 30 adjacent cam surface 68. The sear 74 is so shaped that, as the rack 30 moves upwardly, the sear will turn on its pivot to clear abutment 73 without moving lever 70. On the downward movement of the rack 30, as shown in Figure 11, however, the sear 74 engages the abutment 73 and transmits a thrust thereto, which moves lever 70 from the position shown in Figure 8 to the position shown in Figure 11, thus moving the ejector pins 15 rightwardly from the position shown in Figure 8, and forcing the crimped sheath 23 out of the passageway in which it has been operated upon, and beyond the confines of the mechanism. This action occurs as the rack 30 moves downwardly between its uppermost position, whereat the plate 55 became latched by latch 63 (as shown in Figure 7), and the position whereat the latch has been released, as shown in Figure 12. This ejecting action also occurs during the time interval when the feed rollers 2 and 3 are rotating through the arc represented by the reduced radius 4 of the feed roller 3, so that, until the crimped sheath has been ejected from the mechanism, no further fresh sheath is advanced by the feed rollers 2 and 3. After the downward movement of the rack has reached the position shown in Figure 11, feed roller 3 has been moved to the point where it makes peripheral engagement with the incoming strand of sheath 1, and further downward movement of the rack 30 is effected to advance a new increment of sheath into the passageway between crimper 12 and shoe 56. Finally, as the rack 30 approaches the lower extremity of its travel, the feed roller shaft 36 is turned sufficiently to bring cam 45 into engagement with follower 46 (as shown in Figure 9), which actuates the cutter blade to sever the length of sheath, now occupying the space between crimper 12 and shoe 56, from the supply.

At this time, the parts come to rest and initiation of a new cycle of operations awaits the choice of the operator. While the parts are at rest, the operator is allowed ample time for insertion of the bare ends 22 of lead wires into the funnel-shaped mouth of gate 13, against which the open end 21 of the sheath has come to rest (as shown in Figure 3). After the lead wires are sufficiently inserted into the sheath that the insulation 220 of the lead wires extends within the open end 21 of the sheath, a new cycle of operations is initiated by opening an appropriate valve controlling the supply of pressure fluid through pipe 33. This raises the rack, actuates the crimper, and the cycle of operations continues as hereinabove described.

From the foregoing description, those skilled in the art should readily understand that the invention provides an apparatus whereby insulating sheaths may be readily and quickly applied over the ends of lead wires, cut to length, and securely crimped, without necessitating any tedious hand operation other than that of inserting the lead wires into the open end of the sheath, which operation is itself greatly facilitated by the provision of the funnel-shaped mouth in gate 13, and the movement of the open end of the sheath into alignment with the constricted end of the funnel.

While one specific example of the apparatus has been disclosed in detail, it is to be understood that said example is merely illustrative of the principles of the invention, and the invention is not to be construed as limited thereto. It is realized that those skilled in the art will make numerous modifications and adaptations in the mechanism in order to meet the exigencies of the special circumstances of its use, and accordingly it is to be understood that such modifications and variations are contemplated by and within the scope of this invention.

Having thus described the invention, what is claimed and desired to be secured by Letters Patent is:

1. An apparatus for applying sheath to wires comprising a pair of separable members arranged to define a passageway between them having aligned open ends at opposite sides of the members, said passageway conforming substantially to the shape of said sheath, means adjacent one end of the passageway for advancing a measured length of sheath endwise into the passageway, a cutter at the end of the passageway adjacent the means and arranged to sever sheath in the passageway, a distorting device disposed between the ends of the passageway and arranged to move thereacross, and means for operating said means, said cutter, and said device in succession.

2. In a crimping device comprising relatively movable jaws for holding an article to be crimped, a crimper adjacent said jaws, means for moving said crimper athwart the article while the article is held in said jaws to crimp the article and thereafter separate said jaws, and means for temporarily latching said jaws in separated relation while the crimper retracts.

3. The improvement of claim 2 having means for ejecting the crimped article while the jaws are separated.

4. An apparatus for applying sheath to wires comprising parts defining a passageway open at one end to receive wires and open at the other end to receive sheath, said passageway conforming substantially to the shape of said sheath, means mounted adjacent the last mentioned end of said passageway for feeding a measured length of sheath into the passageway, said wire receiving end of said passageway having a part arranged to abut the end of sheath inserted from the opposite end of said passageway, said part having an aperture aligned with said passageway and being split in the plane of the axis of said passageway, and means normally located at one side of said passageway and intermediate the ends thereof but movable across the passageway to distort sheath in the passageway at the time of such movement.

5. A crimping device comprising a stationary jaw having spaced portions shaped to provide a trough, a movable jaw opposite said stationary jaw and having a portion shaped to provide a trough facing the trough in said stationary jaw, said troughs together defining a passage open at both ends for embracing a substantial part of the periphery of an article to be crimped and confining the same, a member disposed between said spaced portions of the stationary jaw, said member being normally positioned outside of said passage but movable across said passage toward said movable jaw to crimp the article confined between said jaws, and stops on the movable jaw side of said passage for engaging the article to be crimped adjacent the path of movement of said member.

6. The device of claim 5 wherein said member is arranged to move across said passage first to crimp said article and thereafter to separate said movable jaw from said stationary jaw, and means for temporarily latching said jaws in said separated relation while said member retracts toward its said normal position.

7. The improvement of claim 6 having means for ejecting the crimped article while the jaws are latched in separated relation.

8. The apparatus of claim 4 wherein the passageway is separable along the axis of reception of said wires and sheath, and means for separating the parts defining said passageway after the wires and sheath are distorted.

9. An apparatus for applying sheath to wires comprising a crimper, means thereadjacent for feeding sheath endwise into position to be operated upon by the crimper, a wire guide having a funnel mouth for the reception of wires and arranged to guide the wires into sheath positioned as aforesaid, means for moving the crimper in a direction transverse to the direction in which the sheath is fed, and means for actuating said feeding and crimping means successively, said wire guide being separable to permit the wires and crimped sheath to be removed in a radial direction from the funnel mouth.

References Cited in the file of this patent

UNITED STATES PATENTS

| | | |
|---|---|---|
| 1,258,414 | Jacoby | Mar. 5, 1918 |
| 1,530,528 | Singer | Mar. 24, 1925 |
| 1,903,659 | Smith | Apr. 11, 1933 |
| 1,976,929 | Elliott | Oct. 16, 1934 |
| 2,231,286 | Firing | Feb. 11, 1941 |
| 2,254,117 | Keller | Aug. 26, 1941 |
| 2,326,656 | Johnson | Aug. 10, 1943 |
| 2,340,360 | Alden | Feb. 1, 1944 |
| 2,340,448 | Andren | Feb. 1, 1944 |
| 2,343,082 | Proctor | Feb. 29, 1944 |